United States Patent [19]

Haentjens

[11] Patent Number: 4,700,808
[45] Date of Patent: Oct. 20, 1987

[54] SHAFT MOUNTED BEARING LUBRICATING DEVICE

[76] Inventor: Walter D. Haentjens, R.D. #1 - Box 121, Sugarloaf, Pa. 18249

[21] Appl. No.: 886,361

[22] Filed: Jul. 17, 1986

[51] Int. Cl.$^4$ ............................................. F16N 13/20
[52] U.S. Cl. .................................. 184/6.18; 184/11.2; 184/31; 415/143; 415/213 R
[58] Field of Search .................... 184/6.18, 11.1, 11.2, 184/31; 415/143, 175, 213 R; 416/179, 182

[56] References Cited

U.S. PATENT DOCUMENTS

| 2,327,962 | 8/1943 | Drake | 184/6.18 X |
| 2,539,619 | 1/1951 | Goodall | 184/6.18 |
| 2,598,547 | 5/1952 | Ivanoff | 415/175 X |
| 2,673,787 | 3/1954 | Greenawalt | 184/6.18 X |
| 4,068,740 | 1/1978 | Quinn et al. | 184/11.1 X |

FOREIGN PATENT DOCUMENTS 209616 10/1985 Japan .................................. 184/11.1

Primary Examiner—Leonard E. Smith
Attorney, Agent, or Firm—Hill, Van Santen, Steadman & Simpson

[57] ABSTRACT

Lubricant for support bearings in a bearing housing on a vertical rotating shaft is supplied by a rotating impeller mounted on the shaft which includes a dip ring extending into an annular oil reservoir to draw oil upward to the impeller. A passageway from the impeller to a space above an uppermost one of the support bearings enables the lubricant to flow over the bearings and back to the rotating impeller for recirculation. A heat exchanger may be included to cool the lubricating liquid.

17 Claims, 5 Drawing Figures

SHAFT MOUNTED BEARING LUBRICATING DEVICE

BACKGROUND OF THE INVENTION

1. Field of the Invention

The present device relates generally to a rotating shaft bearing system and, more particularly, to a lubrication circulating device for such bearings.

2. Description of the Prior Art

Lubrication of bearings frequently presents a problem when loads or speeds become too great for grease lubrication. Oil lubrication has been provided for such high stress conditions. However, to accomplish the necessary oil circulation, particularly on spaced vertical shaft bearings, it has generally been necessary to provide an external circulating pump for the oil. The external circulating pump is inconvenient, bulky and can prove expensive. Furthermore, if the external pump should fail during operation of the bearings, the results would be disastrous.

SUMMARY OF THE PRESENT INVENTION

The present invention overcomes the problems inherent in external lubrication pumps by providing a self-contained lubricant recirculating system that is driven by the rotating shaft on which the bearings are mounted. The greater the shaft speed, the more lubricant is supplied to the bearings. Also, so long as the shaft rotates, lubricant is pumped to the bearings, avoiding the possibility of an external pump failing independently. Moreover, the present invention can be used to cool the lubricant as it is circulated, resulting in cooler running bearings and more efficient lubricating action for the lubricant.

A lubricating apparatus according to the principles of the present invention includes an impeller, or slinger, mountd to rotate with a rotating shaft, such as a vertical pump shaft. An oil reservoir is provided below the impeller and a dip ring extends from the impeller into a pool of oil within the oil reservoir. The dip ring is shaped so that, as the dip ring and impeller rotate with the shaft, oil is drawn from the reservoir by the dip ring and is thereafter forced by the impeller to circulate to the shaft support bearings. After circulation to the bearings, the oil returns to the impeller and/or reservoir and is again circulated to the bearings.

The circulation path of the oil can be provided with a heat sink or other heat exchanger to cool the circulating oil and, thereby, remove heat from the bearings.

Thus, the present invention provides positive lubrication to shaft supporting bearings in a vertical self-contained unit. The instant device is simple to attach to an existing rotatable shaft, is easily integrated into a bearing system, and utilizes the inherent rotation of the shaft to recirculate lubricant to the bearings.

DESCRIPTION OF THE PREFERRED EMBODIMENTS

Figure 1:
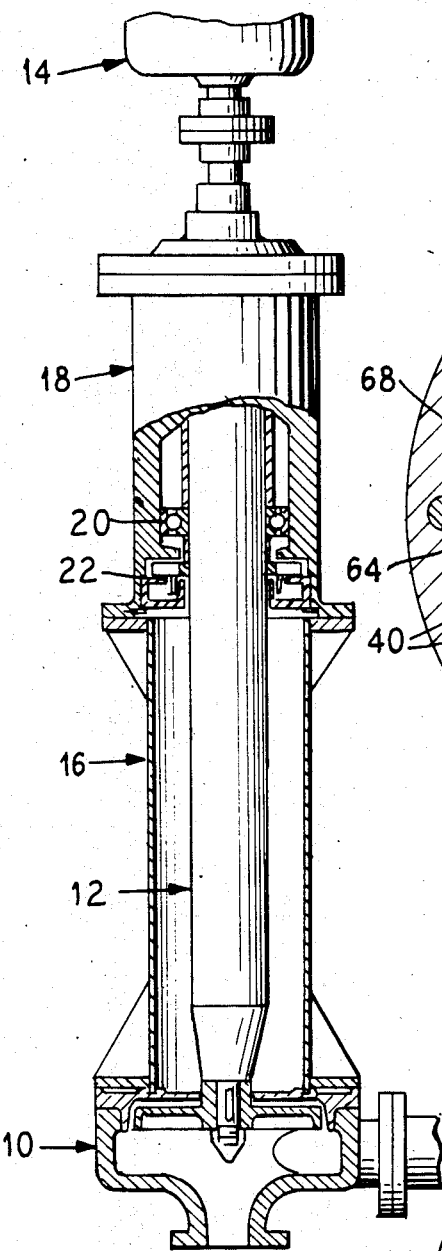
FIG. 1 is a side elevational view of a vertical shaft pump and bearing housing, partially in cross-section, including a bearing lubricating device according to the principles of the present invention.

In FIG. 1 is shown generally a pump 10 connected to one end of a vertical shaft 12, the other end of which is mounted to a motor 14. Surrounding the shaft 12 is a casing 16, including a bearing housing 18. More specifically, the illustrated pump 10 is a centrifugal pump mounted on a vertical cantilevered shaft 12. The shaft 12 is supported by a plurality of bearings 20 mounted within the bearing housing 18. A lubrication recirculating device 22 as taught by the present invention is provided within the bearing housing 18 to maintain a lubricant flow over the bearings 20 during operation of the pump 10.

Although the subject lubricating device is illustrated in conjunction with a vertical shaft cantilevered pump, it is also within the spirit of the present invention to utilize the lubricating device on other types of rotating vertical shaft devices requiring bearing lubrication.

Figures 2, 5:
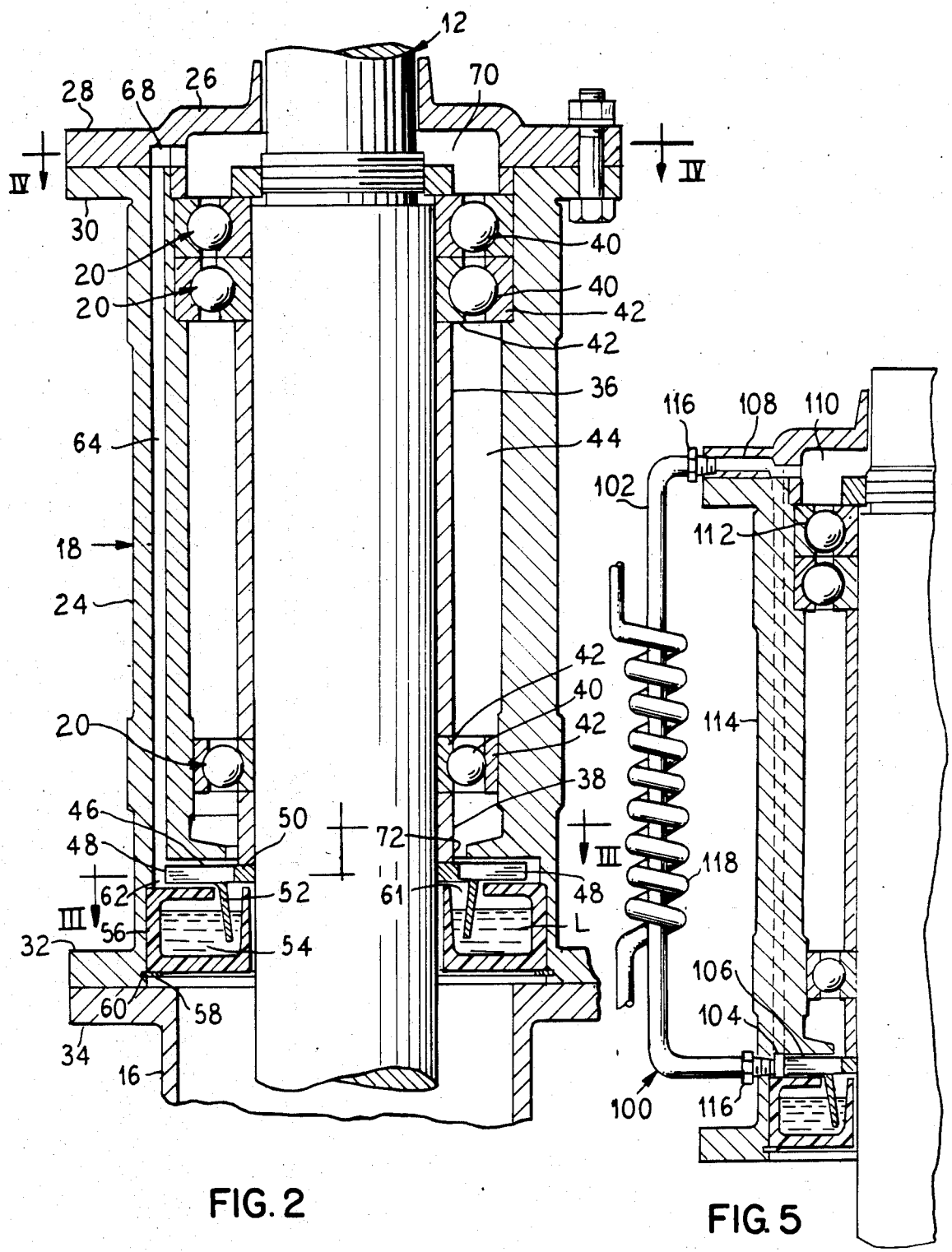
FIG. 2 is a vertical cross-section of the bearing housing portion of the device shown in FIG. 1.
FIG. 5 is a fragmentary vertical cross-section of another embodiment of the present invention, including a heat exchanger.

In FIG. 2, the bearing housing 18 is shown in more detail, including a generally cylindrical body 24, a bearing housing cap 26 secured thereto at opposing flanges 28 and 30 and a second pair of opposed flanges 32 and 34 for connecting the casing 16 to the bearing housing 18. Three sets of rotational support bearings 20 are provided at spaced locations within the housing 18. The bearings 20 are held in place by spacer sleeves 36 and 38 extending around the shaft 12. The bearings 20 are shown as ball bearings 40 movably mounted in a bearing race 42 although roller bearings or other types of bearings may be used instead. A cylindrical space 44 is provided between the bearing housing body 24 and the spacer sleeves 36 and 38 through which lubricant can move to drain said lubricant from the upper bearings 20 and lubricate the lower bearing 20.

Below the lower most one of the bearings 20 is mounted an impeller 46 for rotation with the rotating shaft 12. The impeller 46 includes a plurality of spaced vanes 48 and an annular ring portion 50 adjacent the shaft 12 from which the spaced vanes 48 extend. Extending angularly inward from a lower surface of the impeller 46 is a tapered dip ring 52. The dip ring 52 extends into an oil reservoir 54 formed by a toroid-shaped wall 56 extending around the shaft 12 for holding lubricant L, such as oil. The toroidal wall 56 is held within the bearing housing 18 by a split ring 58 mounted in a slot 60. An opening 61 is provided in a top portion of the toroidal wall 56 through which extends the dip ring 52.

The impeller 46 is disposed within a confined space 62 formed within the bearing housing 18. The confined space 62 is in communication with a passageway 64 that extends to above an uppermost one of the bearings 20. An upper end 68 of the passageway 64 is formed in the bearing housing cap 26 and is in communication with an annular space 70 above the uppermost bearing 20. Below a lowermost one of the support bearings 20 is an annular drain opening 72 which provides communication between the space 44 in which the bearings 20 are mounted and the confined space 62 into which the impeller 46 extends. A recirculating flow path is, thus, formed from the oil reservoir 54, to the confined space 62, up the passageway 64, into the space 70, through the bearings 20 and the cylindrical space 44, and back to the confined space 62 and the oil reservoir 54 through the drain opening 72.

Figure 3:
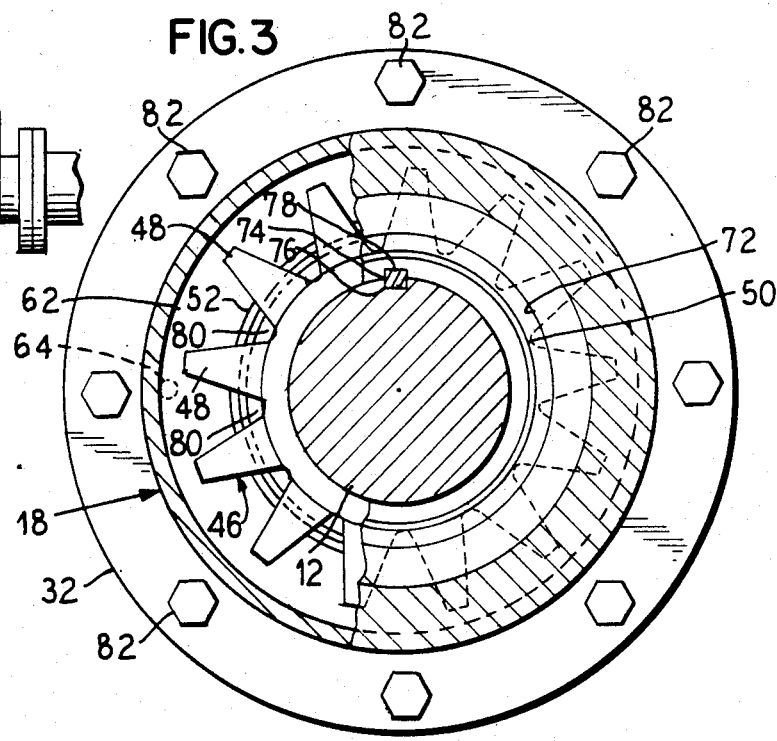
FIG. 3 is a cross-section along lines III—III of the bearing housing shown in FIG. 2 showing an impeller of the present invention.

In FIG. 3, the vaned impeller 46 is shown within the confined space 62 having the spaced vanes 48 extending radially from the mounting ring 50. The impeller vanes can also have other shapes than that shown in FIG. 3. Rotation of the impeller 46 with the shaft 12 is insured by a key 74 extending into a keyway 76 in the shaft 12, which key 74 engages a slot 78 in the mounting ring 50.

The tapered dip ring 52 is shown extending downwardly from the spaced vanes 48 and spanning slots 80 provided between the vanes 48. A plurality of bolts 82 are provided to connect the flange 32 of the bearing housing 18 to the flange 34 of the casing 16. In the illustrated embodiment, one passageway 64 is provided from the confined space 62 extending through the bearing housing 18, although additional passageways may be provided at spaced locations around the bearing housing 18 in other embodiments.

Figure 4:
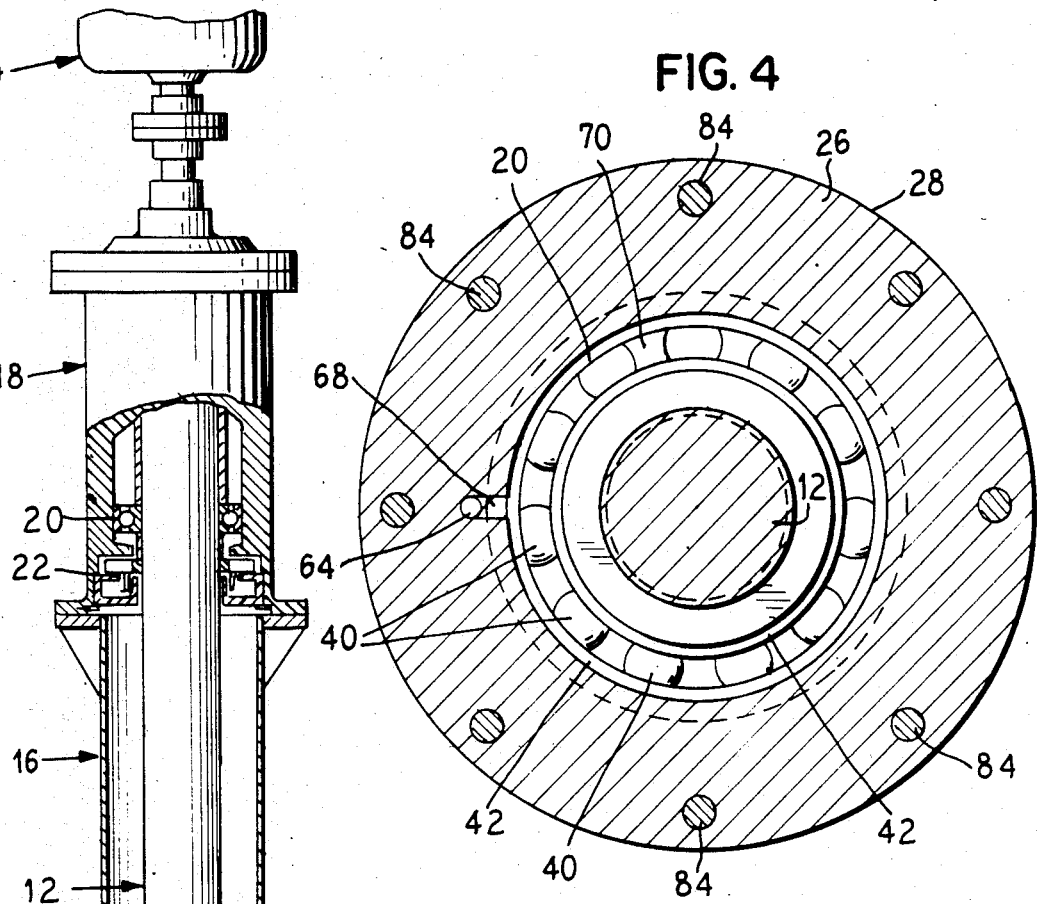
FIG. 4 is a cross-section along lines IV—IV of FIG. 2 showing an oil flow passageway.

Referring now to FIG. 4, the passageway 64 is shown in communication with the annular space 70 above the uppermost bearing assembly 20 through the upper passageway end 68. A plurality of bores 84 through which are fastened connecting bolts for connecting the bearing housing cap 26 to the cylindrical housing member 24 are shown spaced around the flange 28.

The present invention operates as follows: during rotation of the shaft 12, the tapered dip ring 52 rotates within the oil reservoir 54 and causes the lubricant L therein to flow around the interior of the reservoir 54. The centrifugal forces created by the flowing lubricant L causes some of the lubricant L to flow upward on the tapered dip ring 52 and to the rotating impeller 46. At the impeller, or slinger, 46, the lubricant L encounters the spaced vanes 48 and is slung radially outward within the confined space 62.

The rotating impeller vanes 48 create a head pressure within the space 62 which forces the lubricant L through the passageway 64 and into the annular space 70 above the uppermost one of the bearings 20. Once in the annular space 70, the lubricant L is distributed by the moving ball bearings 40 and flows downward to lubricate and cool the bearings 20. The lubricant L continues to flow through the space 44 to the lowermost one of the bearings 20 and then through the drain opening 72. If the shaft 12 is still rotating, the lubricant L encounters the rotating impeller 46 and is recirculated back up through the passageway 64. If the shaft 12 has ceased rotating, the lubricant L from the lowermost bearing 20 drains downward through the drain 72, past the support ring 50 of the impeller 46 and into the oil reservoir 54, where it remains ready for use during subsequent operations of the shaft 12.

A second embodiment is shown in FIG. 5, including a heat exchanger 100 having a lubricant conduit 102 connected in communication with a confined space 104 in which an impeller 106 rotates. An opposite end of the conduit 102 is connected to a passageway 108 extending into an annular space 110 above an uppermost bearing 112. The conduit 102 is connected at either end to a bearing housing 114 by fittings 116. In the embodiment shown, a cooling coil 118 repeatedly encircles the conduit 102 to cool lubricant circulating through the oil conduit 102. The cooling coil 118 is shown merely for purposes of illustration and the present invention is deemed to include any one of a variety of known heat exchangers to remove heat from the lubricant flowing through the conduit 102.

The embodiment shown in FIG. 5 operates substantially the same as that shown in FIGS. 1-4, except that lubricant flows through the conduit 102 to the heat exchanger 100 during recirculation rather than through the passageway 64 shown in dotted outine so as to maintain the lubricant and, thus, the bearings 112 in a cool condition to prevent overheating. The embodiment of FIGS. 1-4 can be modified to add a heat exchanger 100 when required.

Thus, the present invention provides a self-contained lubricant recirculating pump for bearings on a rotating shaft. Lubricant is circulated at a rate at least partially corresponding to the shaft speed and, thus, more lubricant is supplied when more is needed. The lubricant can even be cooled easily as it is circulated. The present device is simple to integrate into a bearing housing, requires no external power source, has few parts, and provides efficient positive lubricant flow through bearings.

Although modifications and changes may be suggested by those skilled in the art, it is the intention of the inventor to embody within the patent warranted hereon all changes and modifications as reasonably and properly come within the scope of his contribution to the art.

I claim as my invention:

1. An oil recirculating device for use with bearings on a rotating vertical shaft, comprising:

means forming an oil reservoir for holding a quantity of oil;

means for drawing oil from said oil reservoir means, said drawing means a smooth ring extending into oil within said oil reservoir means and mounted coaxially of said vertical shaft to rotate with said rotating shaft;

means for pressurizing oil drawn from said oil reservoir means, said pressurizing means being mounted above said smooth ring and driven by said rotating shaft;

means for communicating the pressurized oil to the bearings;

means for returning oil from the bearings to at least one of said oil reservoir and said pressurizing means whereby oil or lubricant is circulated to the bearings during rotation of the shaft.

2. An oil recirculating device as claimed in claim 1, further comprising:

means for cooling the oil during circulation.

3. A lubricant pump for supplying lubricant to bearings mounted within a bearing housing on a vertical axially rotatable shaft, comprising:

an annular impeller encircling the shaft within the bearing housing and mounted for rotation with the shaft; said impeller having a plurality of spaced radially extending slots forming impeller vanes for slinging lubricant outward as said impeller rotates;

an oil reservoir disposed in the bearing housing into which lubricant flows from the bearings;

a dip ring mounted on said impeller and extending into said oil reservoir to draw lubricant from said reservoir to said impeller as said impeller rotates;

a conduit formed to provide communication between said impeller and the bearings; and a drain between the bearings and said impeller for returning lubricant to said impeller;

whereby rotation of the shaft causes lubricant to flow from said oil reservoir, past said impeller, through said conduit, and to the bearings.

4. A lubricant pump as claimed in claim 3, further comprising:
a lubricant cooler mounted for cooling lubricant in at least one of said oil reservoir and said conduit.

5. A lubricant pump as claimed in claim 3, wherein said oil reservoir extends around the shaft below said impeller.

6. A lubricant pump as claimed in claim 3, wherein said dip ring is mounted to said impeller vanes and spanning said radially extending slots, said dip ring having a beveled surface to raise lubricant from said oil reservoir into said radially extending slots by centrifugal force to form a lubricant pump as said impeller rotates.

7. A lubricant pump as claimed in claim 6, wherein said impeller vanes extend radially from a portion of said impeller having a smaller diameter than the diameter of said dip ring, said impeller vanes having free upper and lower surfaces except for an intersection between said dip ring and each of said radially extending vanes so that at least one of lubricant pumping from said oil reservoir and lubricant recirculation occurs.

8. A bearing lubricating device for vertical shaft pumps, comprising:
a vertical shaft for rotational movement to operate the pump;
a bearing housing encircling a portion of said vertical shaft;
at least one bearing assembly mounted in said bearing housing, said bearing assembly supporting said vertical shaft for rotation;
an oil reservoir encircling said vertical shaft for holding oil draining from said at least one bearing assembly;
a vaned impeller mounted for rotation with said vertical shaft between said at least one bearing assembly and said oil reservoir;
a tapered ring mounted on said vaned impeller and extending into said oil reservoir to feed oil from said oil reservoir to said vaned impeller as said impeller rotates; and
an oil passageway extending from said vaned impeller to above said at least one bearing so that oil from said vaned impeller flows to above said at least one bearing;
whereby said vaned impeller rotates to drive oil through said oil passageway to lubricate said at least one bearing as said pump shaft rotates.

9. A bearing lubricating device as claimed in claim 8, further comprising:
a plurality of vertically spaced bearings for supporting said pump shaft; and
wherein said oil passageway extending from below a lowermost one of said plurality of bearings to above an uppermost one of said plurality of bearings.

10. A bearing lubricating device as claimed in claim 8, further comprising:
means for defining a confined space within said bearing housing into which said vaned impeller extends, and
wherein said oil passageway is in communication with said confined space so that oil flows from said confined space into said oil passageway as said vaned impeller rotates.

11. A bearing lubricating device as claimed in claim 8, further comprising:
means for defining a keyway in said vertical shaft; and
a key mounted in said keyway and engaging said vaned impeller to enable said vaned impeller to rotate with said vertical shaft.

12. A bearing lubricating device as claimed in claim 8, wherein
said vaned impeller includes a plurality of circumferentially spaced vanes projecting radially outward from said vertical shaft.

13. A bearing lubricating device as claimed in claim 12, wherein said tapered ring extends between each of said spaced vanes.

14. A bearing lubricating device as claimed in claim 8, wherein
said tapered ring has a first edge secured to said vaned impeller and an opposite second edge extending into said oil reservoir,
said second edge being radially closer to said vertical shaft than said first edge of said tapered ring.

15. A bearing lubricating device as claimed in claim 8, further comprising:
means for reducing the temperature of oil used in said bearing lubricating device.

16. A bearing lubricating device as claimed in claim 15, wherein said oil temperature reducing means includes:
a conduit forming a portion of said oil passageway, said conduit extending externally of said bearing housing; and
heat exchanger means for carrying heat away from said conduit as oil flows through said conduit.

17. A bearing lubricating device as claimed in claim 16, wherein
said heat exchanger means includes a coolant flow tube repeatedly wrapped around said conduit.

* * * * *